(12) United States Patent
Chilimbi et al.

(10) Patent No.: US 6,330,556 B1
(45) Date of Patent: Dec. 11, 2001

(54) DATA STRUCTURE PARTITIONING TO OPTIMIZE CACHE UTILIZATION

(76) Inventors: Trishul M. Chilimbi, 1210 W. Dayton St., Madison, WI (US) 53706; James R. Larus, 8020 SE. 59th St., Mercer Island, WA (US) 98040; Robert Davidson, 640 Lake Samammish Lane NE., Bellevue, WA (US) 98008

(*) Notice: Subject to any disclaimer, the term of this patent is extended or adjusted under 35 U.S.C. 154(b) by 0 days.

(21) Appl. No.: 09/270,125

(22) Filed: Mar. 15, 1999

(51) Int. Cl.[7] ................................................. G06F 17/30
(52) U.S. Cl. ............................ 707/2; 711/129; 711/128
(58) Field of Search .................................... 707/1, 2, 3, 4, 707/5, 6, 100, 101, 102, 103; 711/100, 112, 113, 117, 118, 119, 120, 121, 122, 123–132, 135–139

(56) References Cited

U.S. PATENT DOCUMENTS

| | | | |
|---|---|---|---|
| 5,133,061 | * 7/1992 | Melton et al. | 711/128 |
| 5,471,602 | * 11/1995 | Delano | 711/118 |
| 5,752,038 | 5/1998 | Blake et al. | 395/709 |
| 5,896,517 | * 4/1999 | Wilson | 712/207 |
| 5,897,651 | * 4/1999 | Cheong et al. | 711/3 |
| 5,978,888 | * 11/1999 | Arimilli et al. | 711/128 |
| 5,987,460 | * 11/1999 | Niwa et al. | 707/6 |
| 6,058,456 | * 5/2000 | Arimilli et al. | 711/129 |
| 6,128,613 | * 10/2000 | Wong et al. | 707/7 |
| 6,178,482 | * 1/2001 | Sollars | 711/129 |
| 6,182,194 | * 1/2001 | Uemura et al. | 711/133 |
| 6,205,519 | * 3/2001 | Aglietti et al. | 711/133 |

OTHER PUBLICATIONS

Fraser, C.W., et al., "A Retargetable C. Compiler: Design and Implementation", Benjamin/Cummings, Redwood City, California, (1995).

* cited by examiner

*Primary Examiner*—Thomas Black
*Assistant Examiner*—Mary Wang
(74) *Attorney, Agent, or Firm*—Merchant & Gould PC

(57) ABSTRACT

Fields which are individually addressable data elements in data structures are reordered to improve the efficiency of cache line access. Temporal data regarding the referencing of such fields is obtained, and a tool is used to construct a field affinity graph of temporal access affinities between the fields. Nodes in the graph represent fields, and edges between the nodes are weighted to indicate field affinity. A first pass greedy algorithm attempts to combine high affinity fields in the same cache line or block. Constraints are used to reject invalid combinations of fields. Data structures such as class are partitioned into heavily referenced and less heavily referenced portions. The partitioning is based on profile information about field access counts with indirect addressing used to reference the less heavily referenced partitioned class. A class co-location scheme is used to ensure that temporally correlated classes are placed near each other in cache blocks. A generational garbage collection algorithm is used to ensure that objects that are most heavily referenced are more likely to remain in cache blocks.

27 Claims, 19 Drawing Sheets

FIG. 2

```
Struct: A {
    int a;
    char [64] b;
    char [8] c;
};
Struct: B{
    int x;
    int y;
```

FIG. 4

```
for each structure type
{
    for each instance of this type
    {
        combine field access information for multiple
        occurrence of the same field;

// Build a field affinity graph for this instance
        for each pair of instance fields
        {
            compute field affinity edge weight;
        }
    }

//Combine instance field affinity graphs to create a structure
    // field affinity graph
    for each pair of structure fields
    {
        find all structure instances for which this pair of fields
            has an affinity edge and compute a weighted affinity;
    }
}
```

FIG. 5
Structure field affinity graph
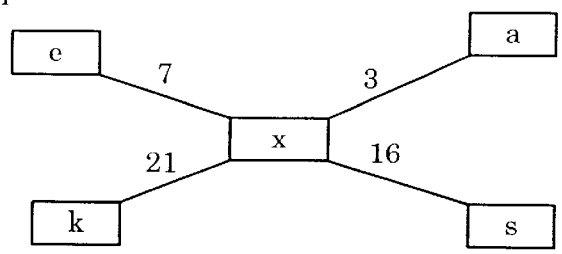
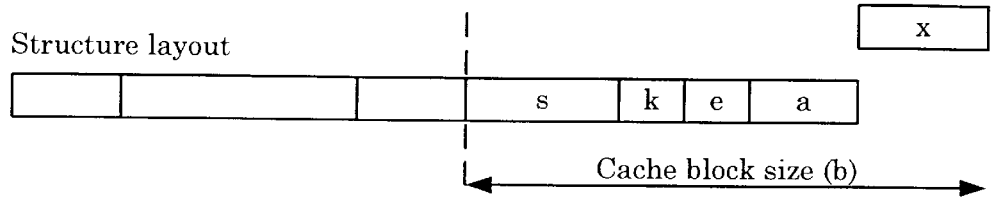
Structure layout

FIG. 8

```
split_classes()
{
    for each class {
        mark_no_split;
        if((active)&&(suitable_size)){
            mark_flds_aggresive;
            if(suff_cold_fields)
                if(nrmlized_temp_diff> 0.5)
                    mark_split;
                else{
                    re-mark_flds_conservative;
                    if(suff_cold_fields)
                        mark_split;
                }
        }
    }
}
```

FIG. 12A

```
Tospace_copy(P)
{
if forwarded(P)
return forwarding_addr(P);
else
{
addr = free;
copy(P, free);
free += sizeof(P);
forwarding_addr(P) = addr;
return addr;
}
}
```

FIG. 12B

```
scavenge ( )
{
Flip roles of Fromspace, Tospace;
unprocessed = free = Tospace;
for R in root set
  R = Tospace_copy(R);
while unprocessed < free
{
  for P in children(unprocessed)
    *P = Tospace_copy(*P);
  unprocessed +=
    sizeof(*unprocessed);
```

FIG. 15 ld baseobjptr, %reg st reg, [$objaccbuf]

add %objaccbuf, 4, %objaccbuf

FIG. 16

```
construct_obj_affinity_graphs()
{
limit = objaccbuf
objaccbuf = OBJ_ACC_BUF_BASE;
while(objaccbuf < limit)
{
insert_locality_queue(objaccbuf);
if(!exists_obj_affinity_node(objaccbuf))
create_obj_affinity_node(objaccbuf);
increment_obj_affinity_edge_wts(objaccbuf);
objaccbuf += 4;
}
}
```

FIG. 17

```
insert_locality_queue ( objaccbuf )
{
if(in_locality_queue(objaccbuf))
{
move_to_queue_tail(objaccbuf);
}
else
{
if (is_queue_full())
delete_queue_hd();
insert_queue_tail(objaccbuf);
}
}
```

FIG. 18

```
increment_obj_affinity_edge_wts (objaccbuf)
{
queue_elem = NULL;
init_locality_queue();
do
{
queue_elem = next_queue_elem();
if(exists_obj_affinity_edge(queue_elem, queue_tail())
increment_affinity_edge_wt(queue_elem, queue_tail());
else
add_affinity_edge(queue_elem, queue_tail());
}while (queue_elem != queue_tail())
}
```

DATA STRUCTURE PARTITIONING TO OPTIMIZE CACHE UTILIZATION

REFERENCE TO RELATED APPLICATIONS

This application is related to co-pending applications having U. S. patent application Ser. No. 09/270,124 Field Reordering to Optimize Cache Utilization and U.S. patent application Ser. No. 09/268,204 Data Structure Partitioning Combined with Garbage Collection to Optimize Cache Utilization assigned to the same assignee as the present application, filed on the same day herewith and hereby incorporated by reference. U.S. patent application Ser. No. 09/024,248 for OPTIMIZED LOGGING OF DATA ELEMENTS TO A DATA STORAGE DEVICE is hereby incorporated by reference, at least with respect to its teaching of the logging of access of data structure elements. U.S. Pat. No. 5,752,038 for METHOD AND SYSTEM FOR DETERMINING AN OPTIMAL PLACEMENT ORDER FOR CODE PORTIONS WITHIN A MODULE which is also hereby incorporated by reference for its teaching of the use of bit vectors which contain multiple bits representing unique time intervals.

STATEMENT OF GOVERNMENT RIGHTS

The present invention was made with government support awarded by the following agency: National Science Foundation Grant (No. NSF 962558). The United States has certain rights in this invention.

FIELD OF THE INVENTION

This invention relates generally to the field of computer memory management and in particular to optimizing cache utilization by modifying data structures.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright © 1999, Microsoft Corporation, All Rights Reserved.

BACKGROUND

Users are demanding increased performance of their applications running on their computers. Computer hardware, including central processing units (CPUs), are becoming increasingly faster. However, their performance is limited by the speed at which data is available to be processed. There are several devices that provide the data. Disk drives, compact disks and other secondary storage devices can store great amounts of data cost effectively, but have great delays in providing data because the physical media on which the data is stored must be moved to a position where it can be read. This type of physical motion requires great amounts of time when compared to the cycle times of processors. The next fastest common data storage device is referred to as random access memory (RAM) which is much faster. However, processor speeds have increased, and even RAM cannot provide data fast enough to keep up with them.

In a typical computer, Level 1 (L1) and Level 2 (L2) cache memories are similar to RAM, but are even faster, and are physically close to a processor to provide data at very high rates. The cache memory is typically divided into 32, 64, or 128 byte cache lines. The size of a cache line normally corresponds to a common unit of data retrieved from memory. When data required by a processor is not available in L1 cache, a cache line fault occurs and the data must be loaded from lower speed L2 cache memory, or relatively slow RAM. The application is often effectively stalled during the loading of this data, and until such time as the data is available to the CPU. By decreasing the number of cache faults, an application will run faster. There is a need to reduce the number of cache line faults and provide data to processors even faster to keep applications from waiting.

Computer applications utilize data structures which are sometimes implemented as classes which are instantiated as objects. Classes define containers of data or information and code which operates on the data in response to method calls from other users or classes. Some classes can be very large, and take up several cache lines. The amount of each class actually used may be significantly less than the amount of data stored in the class. If the entire class is recalled from storage, even though only a small part of it is actually needed, many cache line misses will occur due to them containing unneeded data from the objects. Since there are a limited number of cache lines available for use by an application, it is important to use them efficiently. If there is insufficient space available for the desired data, time is spent in obtaining the data from slower storage and then populating the cache lines so the desired data is more quickly available to the processor.

There is a need for a better way to manage the cache lines so that data commonly needed by applications is available with a minimal amount of cache line misses.

SUMMARY OF THE INVENTION

Data structures are partitioned into heavily referenced and less heavily referenced portions. The partitioning is based on profile information about field access counts. In one embodiment, the most heavily referenced portions or hot portions of an object are kept in a hot object, while the remaining portions of the object are placed in a subordinate or cold object which is referenced by the original hot object as needed.

In a further aspect of the invention, the heavily referenced portions of a hot object are then placed next to each other in memory so that they are likely combined into common cache lines. The "cold" portions which were extracted from the class are placed in a new class that can be referenced from the original class. Accesses to hot portions remain unchanged. One aspect of the invention involves the selection of classes that show the greatest potential and least compatibility problems. A further aspect of the invention involves the use of a cache-conscious object co-location scheme designed to minimize cache misses. Yet a further aspect of the invention involves the application of the partitioning to Java programs.

BRIEF DESCRIPTION OF THE DRAWINGS

FIG. 2 is a pseudo code representation of two data structures showing their size.

FIG. 4 is a pseudo code representation showing the determination of weighted temporal affinity values to pairs of elements.

FIG. 5 is a block diagram showing the structure layout when adding a new element.

FIG. 8 is a pseudo code representation of a class splitting algorithm.

FIGS. 12A and 12B are a pseudo code representation of a traversal algorithm for copying objects into empty space in a cache.

FIG. 15 is a pseudo code representation of instrumentation for a base object address load.

FIG. 16 is a pseudo code representation of an algorithm used to construct an object affinity graph.

FIG. 17 is a further pseudo code representation of the algorithm used to construct an object affinity graph.

FIG. 18 is a further pseudo code representation of the algorithm used to construct an object affinity graph.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into multiple sections. A first section describes the operation of a computer system which implements the current invention. This is followed by a description of a tool called bbcache, which creates an affinity graph showing the affinity of individually addressable data elements. The ability of the tool to then suggest a reordering of such elements to improve cache performance is described, followed by a description of dynamically modifying the application in accordance with the suggested reordering, and then running the application to generate constraints for using the tool again to suggest reordering of the data elements. Next, a description of profiling class member field access counts is described followed by the division of a class into two classes comprising hot access fields and cold access fields with an added level of indirection to the class containing cold access fields. This is followed by a conclusion which describes some potential benefits and describes further alternative embodiments.

Hardware and Operating Environment

Figure 1:
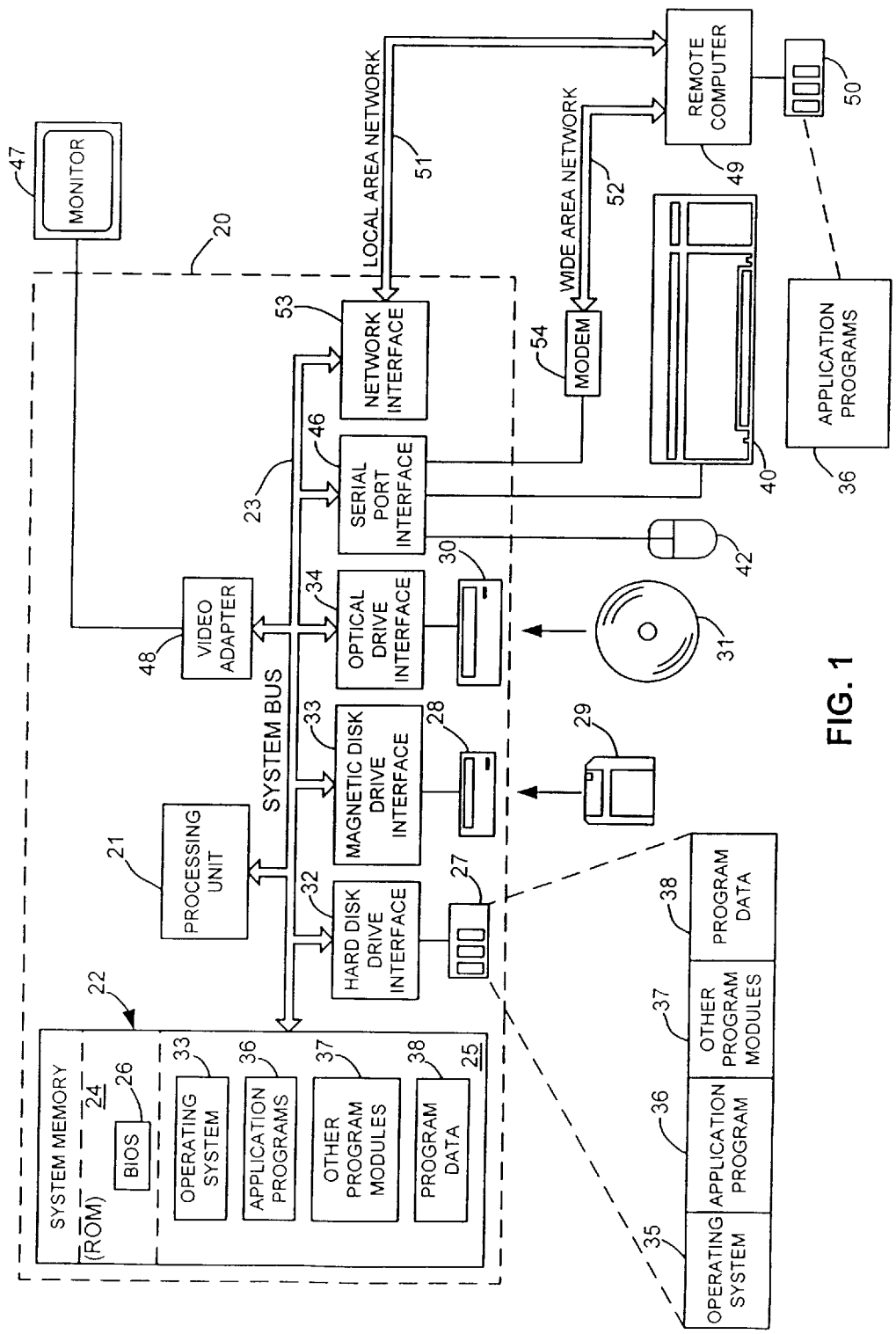
FIG. 1 is a block diagram of a computer system on which the present invention may be implemented.

FIG. 1 provides a brief, general description of a suitable computing environment in which the invention may be implemented. The invention will hereinafter be described in the general context of computer-executable program modules containing instructions executed by a personal computer (PC). Program modules include routines, programs, objects, components, data structures, etc. that perform particular tasks or implement particular abstract data types. Those skilled in the art will appreciate that the invention may be practiced with other computer-system configurations, including hand-held devices, multiprocessor systems, microprocessor-based programmable consumer electronics, network PCs, minicomputers, mainframe computers, and the like which have multimedia capabilities. The invention may also be practiced in distributed computing environments where tasks are performed by remote processing devices linked through a communications network. In a distributed computing environment, program modules may be located in both local and remote memory storage devices.

FIG. 1 shows a general-purpose computing device in the form of a conventional personal computer 20, which includes processing unit 21, system memory 22, and system bus 23 that couples the system memory and other system components to processing unit 21. System bus 23 may be any of several types, including a memory bus or memory controller, a peripheral bus, and a local bus, and may use any of a variety of bus structures. System memory 22 includes read-only memory (ROM) 24 and random-access memory (RAM) 25. A basic input/output system (BIOS) 26, stored in ROM 24, contains the basic routines that transfer information between components of personal computer 20. BIOS 26 also contains start-up routines for the system. Personal computer 20 further includes hard disk drive 27 for reading from and writing to a hard disk (not shown), magnetic disk drive 28 for reading from and writing to a removable magnetic disk 29, and optical disk drive 30 for reading from and writing to a removable optical disk 31 such as a CD-ROM or other optical medium. Hard disk drive 27, magnetic disk drive 28, and optical disk drive 30 are connected to system bus 23 by a hard-disk drive interface 32, a magnetic-disk drive interface 33, and an optical-drive interface 34, respectively. The drives and their associated computer-readable media provide nonvolatile storage of computer-readable instructions, data structures, program modules and other data for personal computer 20. Although the exemplary environment described herein employs a hard disk, a removable magnetic disk 29 and a removable optical disk 31, those skilled in the art will appreciate that other types of computer-readable media which can store data accessible by a computer may also be used in the exemplary operating environment. Such media may include magnetic cassettes, flash-memory cards, digital versatile disks, Bernoulli cartridges, RAMs, ROMs, and the like.

Program modules may be stored on the hard disk, magnetic disk 29, optical disk 31, ROM 24 and RAM 25. Program modules may include operating system 35, one or more application programs 36, other program modules 37, and program data 38. A user may enter commands and information into personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial-port interface 46 coupled to system bus 23; but they may be connected through other interfaces not shown in FIG. 1, such as a parallel port, a game port, or a universal serial bus (USB). A monitor 47 or other display device also connects to system bus 23 via an interface such as a video adapter 48. In addition to the monitor, personal computers typically include other peripheral output devices (not shown) such as speakers and printers.

Personal computer 20 may operate in a networked environment using logical connections to one or more remote computers such as remote computer 49. Remote computer 49 may be another personal computer, a server, a router, a network PC, a peer device, or other common network node. It typically includes many or all of the components described above in connection with personal computer 20; however, only a storage device 50 is illustrated in FIG. 1. The logical connections depicted in FIG. 1 include local-area network (LAN) 51 and a wide-area network (WAN) 52. Such networking environments are commonplace in offices, enterprise-wide computer networks, intranets and the Internet.

When placed in a LAN networking environment, PC 20 connects to local network 51 through a network interface or adapter 53. When used in a WAN networking environment such as the Internet, PC 20 typically includes modem 54 or other means for establishing communications over network 52. Modem 54 may be internal or external to PC 20, and connects to system bus 23 via serial-port interface 46. In a networked environment, program modules, such as those comprising Microsoft® Word which are depicted as residing within 20 or portions thereof may be stored in remote storage device 50. Of course, the network connections shown are illustrative, and other means of establishing a communications link between the computers may be substituted.

Software may be designed using many different methods, including object oriented programming methods. C++ and Java are two examples of common object oriented computer programming languages that provide functionality associated with object oriented programming. Object oriented programming methods provide a means to encapsulate data members (variables) and member functions (methods) that operate on that data into a single entity called a class. Object oriented programming methods also provide a means to create new classes based on existing classes.

An object is an instance of a class. The data members of an object are attributes that are stored inside the computer memory, and the methods are executable computer code that act upon this data, along with potentially providing other services. The notion of an object is exploited in the present invention in that certain aspects of the invention are implemented as objects in one embodiment.

An interface is a group of related functions that are organized into a named unit. Each interface may be uniquely identified by some identifier. Interfaces have no instantiation, that is, an interface is a definition only without the executable code needed to implement the methods which are specified by the interface. An object may support an interface by providing executable code for the methods specified by the interface. The executable code supplied by the object must comply with the definitions specified by the interface. The object may also provide additional methods. Those skilled in the art will recognize that interfaces are not limited to use in or by an object oriented programming environment.

Field Reordering

In FIG. 2, data structures A and B are defined as shown in the pseudo code for a program written in a language such as C which includes individually addressable data elements. In this case, the elements in structure A are a, b and c, where a is a four byte integer, b is a 64 byte text string and c is an eight byte floating point number. Each of these data elements is individually addressable in common pointer based languages. Other languages have similar individually addressable data elements, such as data members in C++ or Java. Fields in relational databases may also be thought of as individually addressable data elements. These data structures are a simple representation of potential data structures described in a computer program application for illustration of the use of the bbcache tool.

Many times an operation by an application on one field will contemporaneously or immediately be followed by an operation on another field. In other words, the operations occur within a short amount of time, which is relative to the speed of the processor, such as 100 milliseconds for current processor speeds of about 300 to 500 megahertz. This results in a high temporal access affinity for those two elements. It does not matter which element is accessed first. By counting the number of such accesses over a selected period of time while actually running the application, and storing such accesses in a trace file, the trace file ends up containing temporal data concerning structure field accesses as well as field access execution counts. This file may be created using the methods described in the above co-pending U.S. patent application Ser. No. 09/024,248 for OPTIMIZED LOGGING OF DATA ELEMENTS TO A DATA STORAGE DEVICE, which is assigned to the same assignee as the present application. Further information regarding obtaining temporal data can be found in U.S. Pat. No. 5,752,038 which is also hereby incorporated by reference for its teaching of the use of bit vectors which contain multiple bits representing unique time intervals. Memory references to data elements cause a bit vector to be located, and the bit for that time interval is set to 1. By later comparing the bit vectors, it is a straight forward exercise to derive desired temporal affinities.

A trace may also be used to collect temporally correlated reference data if desired by tracing all memory references and using a sliding time window to identify references to each other that are within the selected time window. As above, 100 milliseconds is used in one embodiment. Other embodiments may use intervals ranging from 50 to 1000 milliseconds as most structures do not appear to be very sensitive to the exact interval used to define contemporaneous access. Of course, these time intervals will scale with processor speeds as they increase. Static program analysis may also be used to determine which fields may be contemporaneously accessed. Such analysis can range from a programmer familiar with the program making educated estimates, or from tools written to analyze program data structure usage.

Figure 3:
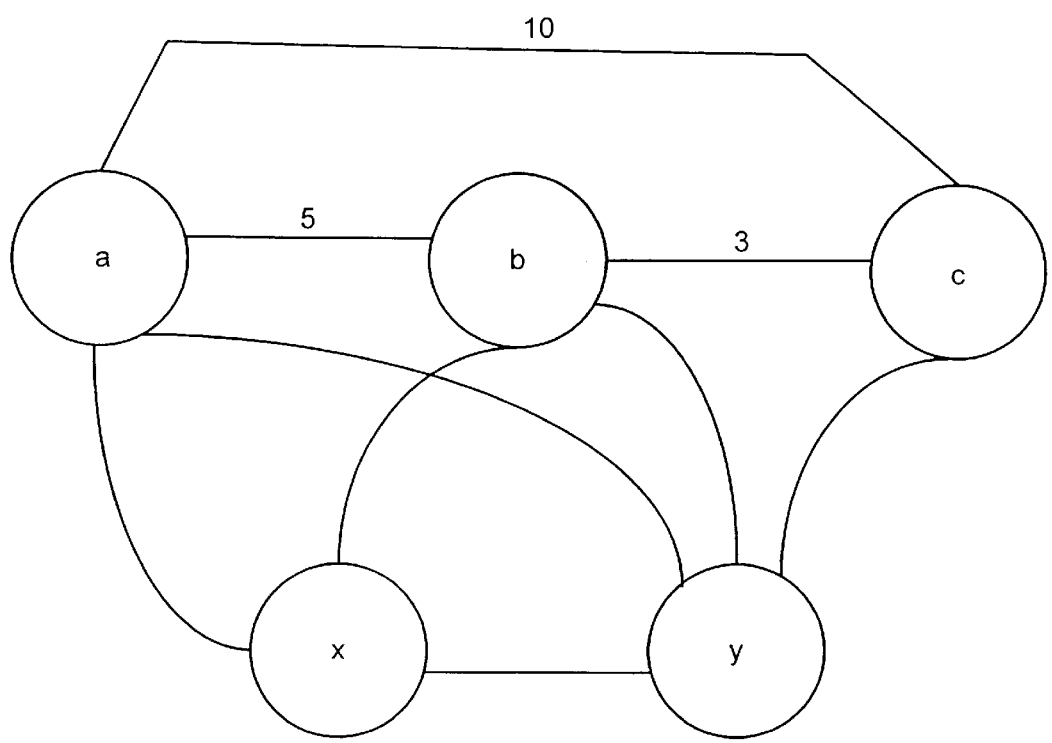
FIG. 3 is an affinity graph showing temporal affinity for elements in the data structures of FIG. 2.

A field affinity graph is constructed by bbcache as shown in FIG. 3. Each of the data elements defined in FIG. 2 are shown as nodes in FIG. 3 with arcs or edges drawn between them. The nodes are representative of all instances of the data structure. The edges are weighted to indicate field affinity, which is a function of temporal information and execution frequency with each structure access point as derived from the trace file. To derive the field affinity, the trace file is read, and a structure access database is built as a hash table on structure names. Each hash table entry represents a structure type and contains a list of structure instances. Every structure instance contains a list of fields that were accessed through that instance, and each field in turn contains information about each source location where it is accessed. Alternatives for the hash table include any type of data structure that maps from a structure name to the list, including relational databases, flat files and search trees.

To construct the field affinity graph, each structure instance is used to construct an instance field affinity graph, where nodes represent fields and edges between nodes are weighted to indicate field affinity. Multiple individual structure affinity graphs (at least one for each instance) are then combined to produce a single structure affinity graph as shown in FIG. 3. The nodes in the resulting field affinity graph may also be determined without the use of a graph for each instance, simply by directly mapping the field references through each instance into the final field affinity graph.

One method of determining the affinity for each pair of fields within the structure comprises counting the number of time intervals in field trace where both fields were referenced. An example is where a trance is 20 time intervals long, and field1 is referenced in time intervals 0,1,2,3,4,5, 6,7,8,9,14,15. Field2 is referenced in time intervals 4,5,6,7, 8,9,10,11,12,13,14,15. The resulting affinity of field1 ×filed 2 is 8, the number of common time intervals (4,5,6,7,8,9, 14,15). This is computed for each instance, and then each instance is summed to create the structure affinity weights.

It should be noted that fields a, b and c all have edges between them, and in addition, they have edges between data elements x and y from data structure B. However, the edges between data elements from different structures may be effectively ignored in one embodiment due to the low likelihood of relevant affinity and due to reordering limitations inherent in some languages. In a further embodiment, edges between data elements in different data structures are not even put in the model, so no time is wasted determining their affinity.

A pseudo code representation in FIG. 4 shows how the affinity edge weight is determined by bbcache for a structure field affinity graph. For each structure type, and for each instance of the structure type, field access information for multiple occurrences of the same filed are first combined. The field affinity graph for each instance of the structure type is built for each par of instance fields. An affinity edge weight for such pair is then computed. This results in multiple instance filed affinity graphs as each instance of the structure type is processed. The resulting instance affinity fields are then combined to create a structure filed affinity graph for each pair of structure fields. A weighted affinity is then computed for all structure instances for which this pair of fields has an affinity edge. The process is repeated with each structure type, resulting in the generation of the weighted affinity graph where edge weights are proportional to the frequency of contemporaneous access.

The highest affinity seen in FIG. 3 is between elements a and c, which have an affinity of ten. Elements a and b come in next with an affinity of five, with elements b and c having an affinity of three. Intuitively, this would indicate that an attempt to define elements a and c near each other should be made, and in addition, include element b with a. However, due to the size of elements a and b in relation to the size of a cache line in one embodiment, their combined size (4 bytes+64 bytes) would exceed the 64 byte size of a typical cache line.

Since structure alignment with respect to cache block boundaries is usually determined at run time (unless selected pointers are suitably manipulated), inherent locality is increased by placing fields with high temporal affinity near each other. By placing such fields near each other, they are likely to reside in the same cache block. Further embodiments may track exactly how fields are written to cache blocks, and optimally pack fields exactly into cache blocks. If alignment (natural boundary) constraints would force a gap in the layout that alternative high temporal affinity fields are unable to occupy, an attempt is made to fill these with structure fields that were not accessed in the profiling scenario.

A notion of configuration locality is used to explain bbcache's algorithm. Configuration locality attempts to capture a layout's inherent locality. The first step is to compute a layout affinity for each field, which is the sum of its weighted affinities with neighboring fields in the layout up to a predefined horizon (presumably equivalent to the cache block size) on either side. If field $f_i$ is surrounded by fields $f_1, \ldots, f_n$, in the layout, then its layout affinity is:

$$\text{Field layout affinity}(f_i)=\text{wt}(f_1, f_i)*\text{aff}(f_1,f_i)+ \ldots +\text{wt}(f_n, f_i)*\text{aff}(f_n, f_i)$$

The weights, wt, correspond to the distance between the fields—the number of bytes separating the start of the fields—and are a measure of the probability that the fields will end up in the same cache block. The weighting factor used is:

$$\text{wt}(f_i, f_j)=((\text{cache}_{13}\text{ block\_size}-\text{dist}(f_i, f_j))/\text{cache\_block\_size})$$

A structure's configuration locality is the sum of its field layout affinities. FIG. 5 illustrates the process of computing the increase in configuration locality from adding field x to an existing layout.

Figure 6:
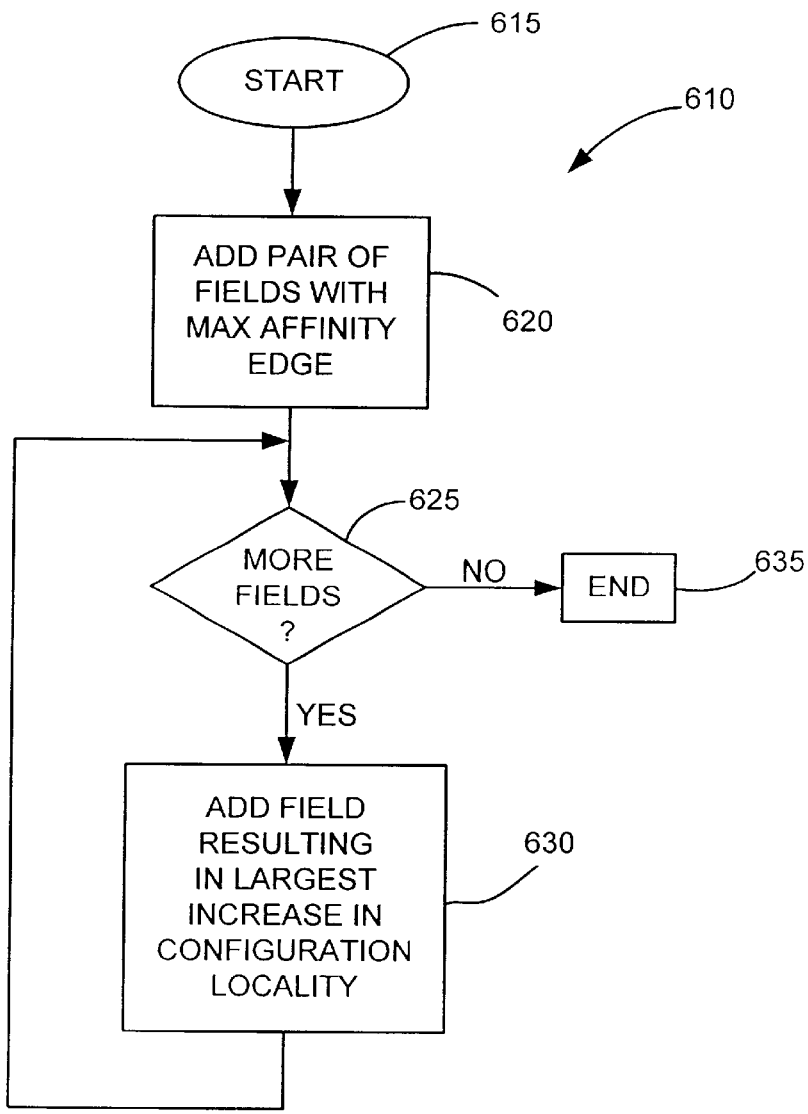
FIG. 6 is a flow chart showing the adding of fields using a first pass greedy algorithm.

To produce a structure field order recommendation from a structure field affinity graph, field layout is optimized for inherent locality by placing fields that show strong affinity close to each other, rather than trying to pack fields exactly into cache blocks. bbcache uses a greedy algorithm indicated generally at 610 in FIG. 6 to produce structure field order recommendations from a structure field affinity graph. It starts 615 by adding the pair of fields, connected by the maximum affinity edge in the structure field affinity graph, to the layout at block 620. Then, if there are more fields that have not been added as indicated at 625, a single field is appended to the existing layout at 630. The field selected is the one that increases configuration locality by the largest amount at that point in the computation. This process is repeated until all structure fields are laid out at 635.

After the highest affinity fields have been added, the order in which remaining fields are added has little impact on performance because the remaining fields are infrequently referenced. As such, they may be added in any order if desired. Most performance gains are achieved during the assignments of the first few layouts.

While the best way to evaluate a structure field ordering is to measure its impact on performance, this entails a tedious cycle of editing, recompiling, and rerunning the application. A quality metric for structure field orderings can help compare a recommended layout against the original layout and help evaluate alternative layouts, without rerunning the application. This is especially useful when field layout constraints prevent directly following the field ordering recommendations.

bbcache provides two metrics to evaluate structure field orders, as well as a query facility to compare alternative layouts. The first is a metric of the average number of structure cache blocks active during an application's execution (i.e., a measure of a structure's cache block working set or cache pressure). This metric is computed by combining temporal information for field accesses with a structure's field order to determine active cache blocks. A program's execution is divided into temporal intervals of 100 ms each. This metric assumes that structures start on cache block boundaries, and uses the field order (and field sizes) to assign fields to cache blocks. If any of the fields in a cache block are accessed during an execution interval, that block is considered to be active in that interval. Let n represent the total number of program execution intervals, and $b_1, \ldots, b_n$ the number of active structure cache blocks in each of these intervals. Then a structure's cache block pressure is:

Cache block pressure=$\Sigma(b_1, \ldots, b_n)/n$

The second metric is a locality metric that measures a structure's average cache block utilization. Let $f_{ij}$ represent the fraction of cache block j accessed (determined by accessed field sizes relative to the cache block size) in program execution interval i, then:

Cache block utilization=$\Sigma(f_{11}, \ldots, f_{nbn})/\Sigma(b_1, \ldots, b_n)$ A layout configuration affinity is then computed by calculating for each field in the layout, its affinity with surrounding fields, until a predefined horizon (presumably equivalent to the cache block size) on either side. In addition, the affinity of a field to neighboring fields is weighted by the distance between the two fields, where the weight is a measure of the probability that the two fields will end up in the same cache block. A layout configuration affinity is then the sum of these field layout affinities for all fields in the layout. The layout configuration affinity can be used to determine whether one particular layout, which comprises all the layout blocks, is likely to be better than the original layout, or other layouts which have been generated.

Further constraint based checks may be performed during each check of size in FIG. 6. These checks involve determining if any reordering of fields violates constraints that are either imposed by the language that the application is written in, by the logic of the program itself or by metadata either created by the programmer to identify constraints, or generated by program analysis. Such metadata identifies constraints such as those related to elements being passed outside the program, those having pointers to them or references to them. Further, the passing of elements to dynamic linked libraries or anything outside its context might be identified as a constraint in the metadate. Many other such constraints may also be identified resulting from data elements going to disk or being passed to the operating system or network. Further constraints may be generated by having elements involved in structures that are aliased to each other. If viewed as two separate structures, an operation on one may not be reflected on another structure. Further, programmers can generate an address at random and treat it as any type of data structure desired, which can result in further constraints. These checks occur at block 630 in FIG. 6.

While one result of the invention is a recommended layout of the fields defined in an application, a further embodiment actually makes the recommended changes and then run the resulting application. By monitoring the points at which the application fails, if any, further constraints may be imposed on combinations of elements at block 630. This provides the ability to dynamically modify layouts of actual applications.

In one embodiment, while running the application with dynamically reorganized fields, a data element which was involved in an error in running the application is tracked. A constraint on reordering this element may then be associated with that data element during a second run through the layout process. This will result in a new layout, which again may be implemented dynamically and the application run again. By iteratively running through the layout and testing process to generate real time constraints, many layout configurations may be generated, without the programmer needing to become involved with the process.

A further embodiment involves statically analyzing the program or application to detect these constraints and to avoid reordering constrained structures.

Figure 7:
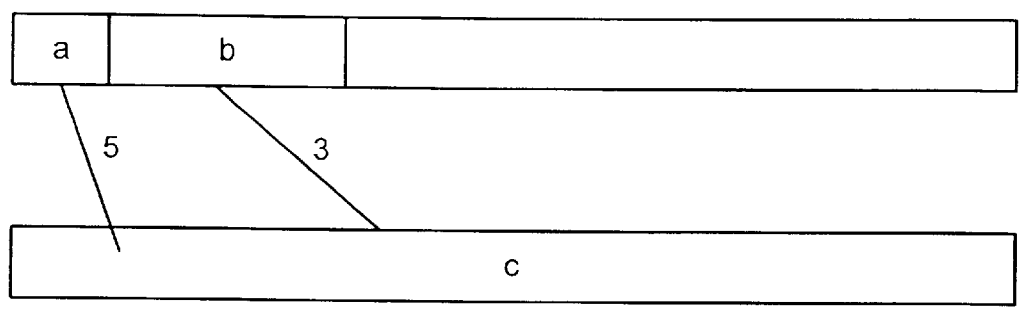
FIG. 7 is a block diagram showing one example field layout.

FIG. 7 is a block representation of the resulting recommended layout of two cache blocks that relate to the simplified data structure A defined in FIG. 2. As can be seen, elements a and c, having a weight of 10 are laid out adjacently to increase the likelihood that they will be combined on the first cache block. Element b, which has comparative weights of 5 and 3, for a total of 8, ended up on the second cache block. The weight of the edges that go between cache block has been minimized by the process above.

While dynamic reordering of fields can be performed, one desired way to obtain a useful, concrete and tangible result is to provide layout suggestions to the programmer and let them determine what is constrained, or try it and see if it breaks. These suggestions may be provided in an ordered list of data elements which should be defined together, or in one of many graphical representations such as that shown in FIG. 7. They may be provided in hardcopy, or displayed on a computer display. Further, as discussed above, changes in element definitions may actually be made directly in the application. Further embodiments also include actual suggested definition modifications.

Data Structure Splitting

In the Java and other programming languages, the vast majority of objects are smaller than a cache block. Many are less than 32 bytes. Field reordering in such an environment is less likely to result in any performance benefit. Instead, classes are split into a hot and cold portion based on field access counts, and then a cache-conscious object co-location technique is used to combine high access count hot objects or classes such that they are likely to be resident on the same cache line. It should be noted that references to Java and classes is meant to cover other programming languages as well. The term "classes" is used to refer to data structures where the in memory organization of the data is left to the language implementer. Many of the other attributes of object oriented languages may or may not be present.

A Java program is first profiled to collect field access counts. These counts are used to label class member fields as hot or cold. The cold fields are extracted from the class and placed in a new class that can be referenced from the original, hot class. The code is modified to replace all accesses to cold fields with an extra level of indirection through the new class. Accesses to hot fields remain unchanged.

Class splitting involves several trade-offs. Its primary advantage is the ability to pack more (hot) class instances in a cache block. Its disadvantages include the cost of an additional reference from the hot to cold portion, code bloat, more objects in memory, and an extra indirection for cold field accesses. One class splitting algorithm is now described that considers these issues while selecting classes to split.

The problem of splitting classes into a hot and cold portion based on field access counts has a precise solution only if the program is rerun on the same input data set. However, it is desirable to split classes so the resulting program performs well for a wide range of inputs. An optimal solution to this problem is unnecessary since field access frequencies for different program inputs are unpredictable. Instead, the class splitting algorithm uses several heuristics. While none of these heuristics may be optimal, measurements have demonstrated that they work well in practice. In addition, they worked better than several alternatives that were examined. In the ensuing discussion, the term "field" refers to class instance variables (i.e., non-static class variables).

FIG. 8 contains pseudo code for the splitting algorithm. The splitting algorithm only considers classes whose total field accesses exceed a specified threshold. This check avoids splitting classes in the absence of sufficient representative access data. While alternative criteria undoubtedly exist, the following formula worked well for determining this threshold. Let LS represent the total number of program field accesses, C the total number of classes with at least a single field access, $F_i$ the number of fields in class i, and $A_i$ the total number of accesses to fields in class i, then the splitting algorithm only considers classes where:

$$A_i > LS/(100*C)$$

These classes are called the 'live' classes. In addition, the splitting algorithm only considers classes that are larger than eight bytes and contain more than two fields. Splitting smaller classes is unlikely to produce any benefits, given the space penalty incurred by the reference from the hot to the cold portion.

Next, the algorithm labels fields in the selected 'live' classes as hot or cold. An aggressive approach that produces a smaller hot partition, and permits more cache-block co-location, also increases the cost of accessing cold fields. These competing effects must be balanced. Initially, the splitting algorithm takes an aggressive approach and marks any field not accessed more than $A_i/(2* F_i)$ times as cold. If the cold portion of class i is sufficiently large to merit splitting (at least 8 bytes to offset the space required for the cold object reference), the following condition is used to counterbalance overaggressive splitting:

$$(\max(hot(class_i)) - 2*\Sigma cold(class_i))/\max(hot(class_i)) > 0.5$$

where the hot and cold functions return the access counts of a class' hot and cold fields, respectively. This condition can be informally justified as follows. Consider instances of two different classes, $o_1$ and $o_2$, that are both comparable in size to a cache block and that have a high temporal affinity. Let instance $o_1$ have n fields that are accessed $a_1, \ldots, a_n$ times, and $o_2$ have m fields that are accessed $b_1, \ldots, b_m$ times. It is reasonable to expect the following access costs (# of cache misses) for the class instances $o_1$ and $o_2$:

$$\max(a_1, \ldots, a_n) < cost(o_1) < \Sigma(a_1, \ldots, a_n)$$

$$\max(b_1, \ldots, b_m) < cost(o_2) < \Sigma(b_1, \ldots b_m)$$

Now if the hot portion of $o_1$ is co-located with the hot portion of $o_2$ and these fit in a cache block, then:

$$cost(o_1) + cost(o_2) \approx (\max(hot(class_1), hot(class_2)) \epsilon) + 2*(\Sigma cold(class_1) + \Sigma cold(class_2))$$

since cold fields are accessed through a level of indirection. This will definitely be beneficial if the sum of the (best case) costs of accessing original versions of the instances is greater than the access cost after the instances have been split and hot portions co-located:

$$\max(a_1, \ldots, a_n) + \max(b_1, \ldots, b_m) > ((\max(hot(class_1), hot(class_2)) + \Sigma) + 2*(\Sigma cold(class_1) + \Sigma cold(class_2))) \text{ i.e.:}$$

$$\min(\max(hot(class_1)), \max(hot(class_2))) > 2*(\Sigma cold(class_1) + \Sigma cold(class_2)) + \epsilon$$

Since apriori we do not know which class instances will be co-located, the best we can do is to ensure that:

$$TD(class_i) = \max(hot(class_i)) - 2*(\Sigma cold(class_i)) >> 0$$

This quantity is termed the 'temperature differential' for the class. For classes that do not meet this criteria, a more conservative formula is used that labels fields that are accessed less than $A_i/(5*F_i)$ as cold. If this does not produce a sufficiently large cold portion (>8 bytes), the class is not split.

Figure 9:
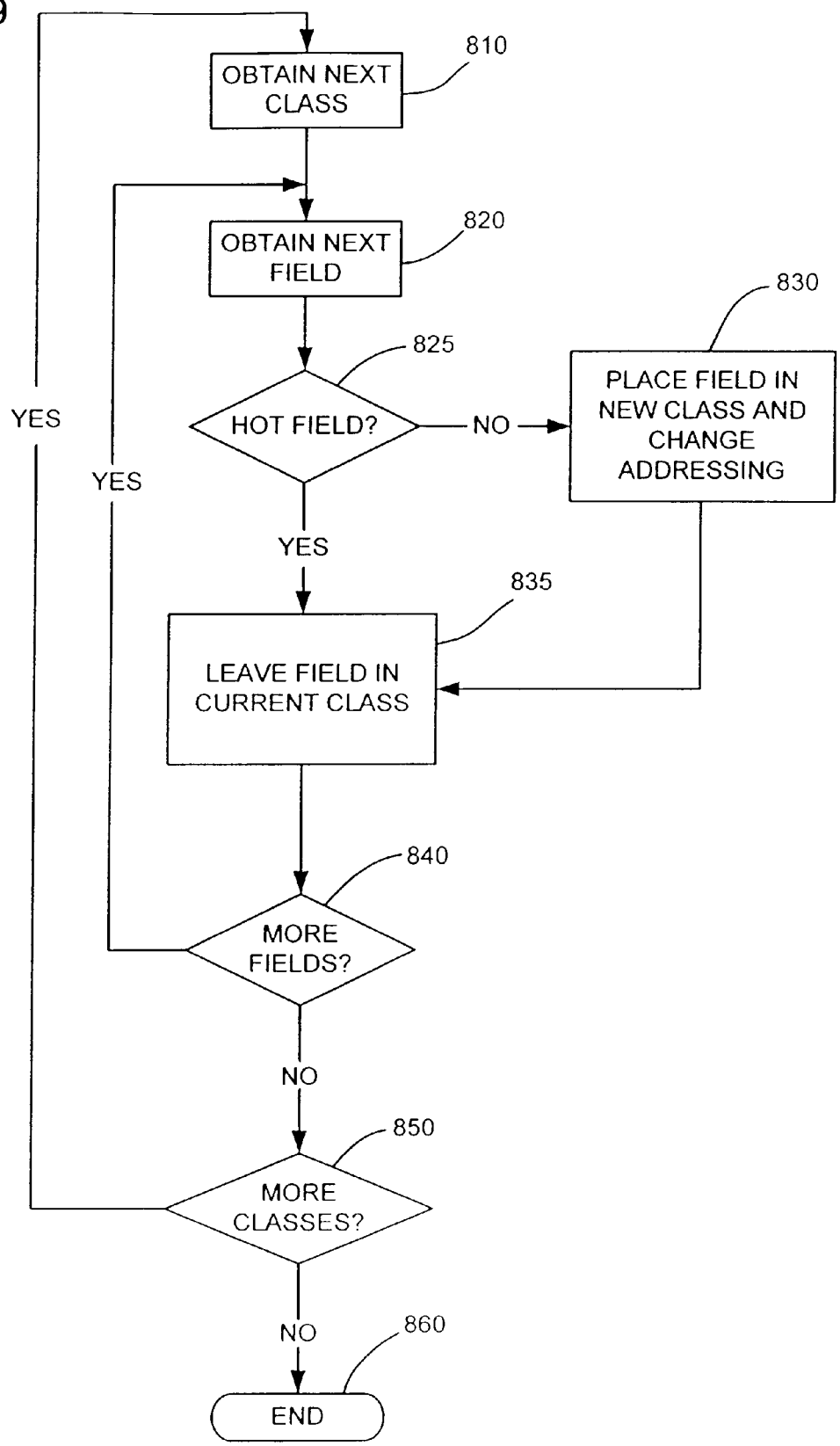
FIG. 9 is a flow chart of partitioning classes using hot/cold field information.

The compiler was again modified to partition classes using the hot/cold field information to implement the process shown in FIG. 9. The cold fields are extracted from each class on a class by class basis and placed in a new class that is referenced from the original or hot class. An additional field, which is a reference to the new cold class, is added to the original, hot class, which now contains the hot fields. Cold fields are labeled with a public access modifier. This is needed to permit access to private and protected cold fields through the cold class reference field in the original class. Accesses to hot fields remained unchanged. In further detail, at 810, the next class is obtained and the next field in that class is considered at 820. At 825, a decision block determines if the field has been identified as a hot field. If it has not been so identified, it is placed in a new class and references to it are changed through an additional level of indirect addressing at 830. In one embodiment, all references to it, first go to the original object, and then are rerouted to the new object. In other embodiments, the entire program or application is modified so that each reference to such structures, including those within the original object are redirected to the new object through use of the new name of the new object. If the field was a hot field, the current field is left in the current class at 835. A decision block 840 then determines if there are more field members in the current class. If so, the next field is considered at 820. If not, a decision block 850 determines if there are more classes that have not been processed. If none, processing ends at 860. If there are further classes, processing continues with the next class at 810.

Figure 10:
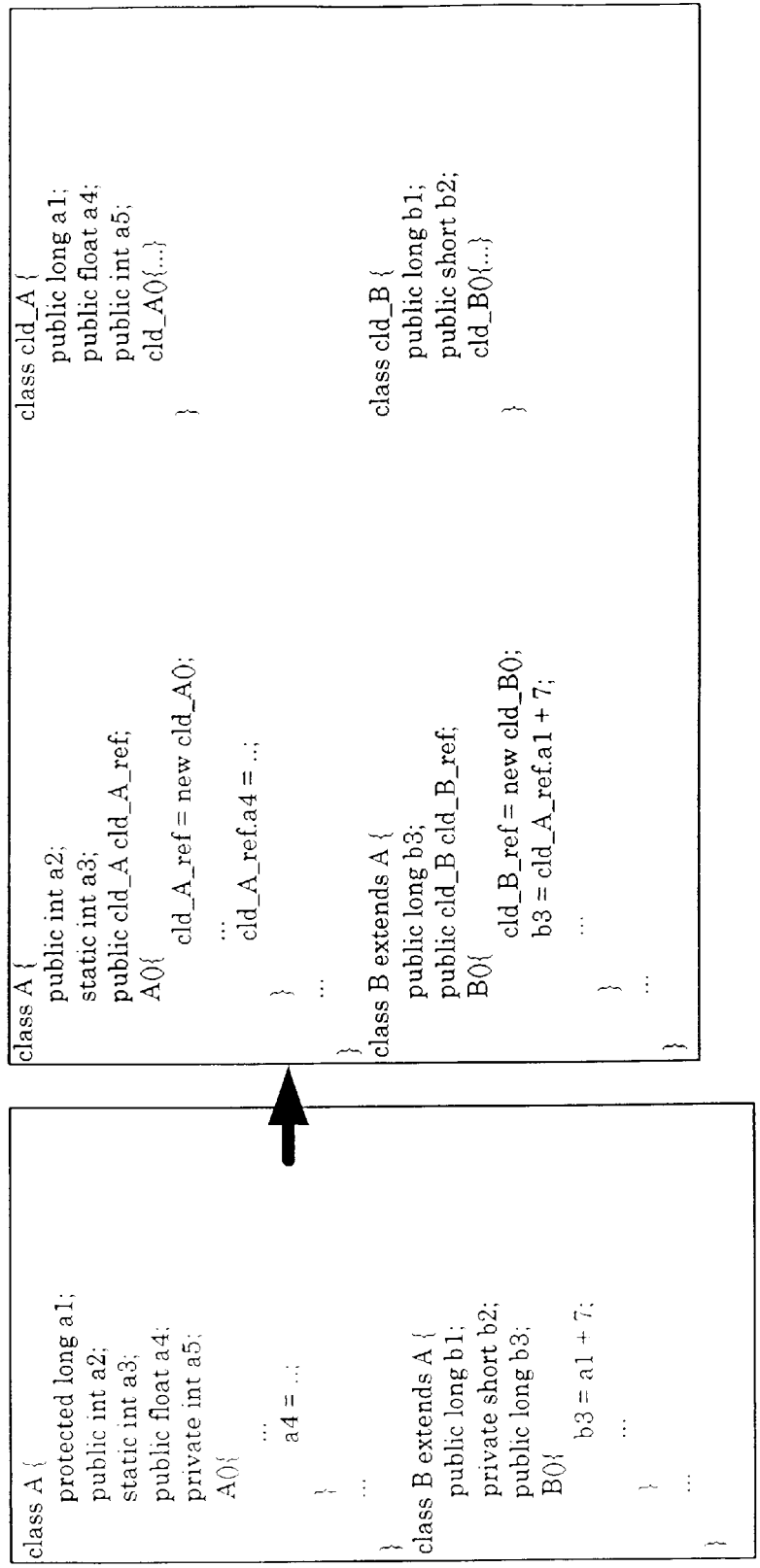
FIG. 10 is a pseudo code representation of how a simple code example is modified to account for split classes.

An example of how a compiler modifies a simple code example to account for split classes is shown in FIG. 10. Transformations include replacing accesses to cold fields with an extra level of indirection through the cold class reference field in the hot class. In addition, hot class constructors first create a new cold class instance and assign it to the cold class reference field.

Cache-Conscious Object Co-Location Scheme

A cache-conscious object co-location scheme is then applied to the modified program to ensure that objects/classes that are most commonly referenced together are stored proximate to each other in order that they are likely to be resident on the same cache line when used by the processor during execution of the program. The scheme is similar to that used above for field reordering in that temporal access data is obtained through running of the program, followed by one of many different algorithms which may be used to determine as close to optimal a layout of the objects as possible given time and resource constraints.

The co-location scheme uses two data placement techniques, clustering and coloring, which improve a pointer structure's cache performance. Clustering places structure elements likely to be accessed contemporaneously in the same cache block. Coloring segregates heavily and infrequently accessed elements in non-conflicting cache regions.

Clustering attempts to pack data structure elements likely to be accessed contemporaneously into a cache block. Clustering improves spatial and temporal locality and provides implicit prefetching. An effective way to cluster a tree is to pack subtrees into a cache block. For a series of random tree searches, the probability of accessing either child of a node is ½. With k nodes in a subtree clustered in a cache block, the expected number of accesses to the block is the height of the subtree, $\log_2(k+1)$, which is greater than 2 for k>3. This analysis assumes a random access pattern. For specific access patterns, such as depth-first search, other clustering schemes may be better. In addition, tree modifications can destroy locality. However, for trees that change infrequently, subtree clustering is more efficient than allocation-order clustering.

Caches have finite associativity, which means that only a limited number of concurrently accessed data elements can map to the same cache block without incurring conflict misses. Coloring maps contemporaneously-accessed elements to non-conflicting regions of the cache. In one embodiment, a cache with C cache sets, where each set contains a=associativity blocks, is partitioned into two regions. One region contains p sets, and the other C-p sets. Frequently accessed structure elements are uniquely mapped to the first cache region and the remaining elements are mapped to the other region. The mapping ensures that heavily accessed data structure elements do not conflict among themselves and are not replaced by infrequently accessed elements. For a tree, the most heavily accessed elements are the nodes near the root of the tree.

Two strategies for applying placement techniques to produce cache-conscious data layouts comprise cache-conscious reorganization and cache-conscious allocation. Cache-conscious reorganization utilizes structure topology or profile information about data access patterns to transform pointer structure layouts. This approach is incorporated into a utility referred to as ccmorph. ccmorph reorganizes tree-like structure, such as trees, lists, and chained hash tables, by clustering and coloring the structure. A programmer need only supply a function that helps traverse the data structure. Cache-conscious allocation improves on convention heap allocators by attempting to co-locate contemporaneously accessed data elements in the same physical cache block. A memory allocator referred to as ccmalloc implements this strategy. A programmer need only specify an additional argument to a normal memory allocation function—a pointer to a structure element likely to be in contemporaneous use. While the use of such an allocation scheme can further improve performance, many different allocation schemes can also work. A further scheme, involving the use of garbage collection, is described next, provides significant performance benefits, even without the use of an allocation scheme.

If a programmer guarantees the safety of an operation to reorder data structures, ccmorph transparently reorganizes a data structure to improve locality by applying the above described clustering and coloring techniques. Reorganization is appropriate for read-mostly data structure, which are build early in a computation and subsequently heavily referenced. With this approach, neither the construction or consumption code need change, as the structure can be reorganized between the two phases. Moreover, if the structure changes slowly, ccmorph can be periodically invoked.

ccmorph operates on tree-like structures with homogeneous elements and without external pointers into the middle of the structure. However, it allows a liberal definition of a tree in which elements may contain a parent or predecessor pointer to the root of a data structure, a function to traverse the structure, and cache parameters.

ccmorph copies a structure into a contiguous block of memory (or a number of contiguous blocks for large structures). In the process, it partitions a tree-like structure into subtrees that are laid out linearly. The structure is also colored to map the first p elements traversed to a unique portion of the cache (determined by a color_const parameter) that will not conflict with other structure elements. ccmorph determines the values of p and size of subtrees from the cache parameters and structure element size. In addition, it takes care to ensure that gaps in the virtual address space that implement coloring correspond to multiples of the virtual memory page size.

A complementary approach is to perform cache-conscious data placement when elements are allocated. In general, a heap allocator is invoked many more times than a data reorganizer, so it must use techniques that incur low overhead. ccmalloc takes an additional parameter that points to an existing data structure element likely to be accessed contemporaneously (e.g., the parent of a tree node). ccmalloc attempts to locate the new data item in the same cache block as the existing item. Local examination of the code surrounding the allocation statement provides sufficient information by which to select a suitable parameter. The approach is illustrated by the following pseudo code:

```
void addList (struct List *list,
              struct Patient *patient)
{
    struct (List *b;
    while (list !=NULL) {
        b =list;
        list =list->forward;
    }
    list =(struct List *)
          ccmalloc(sizeof(struct List),b);
    list->patient =patient;
    list->back =
    list->forward =NULL;
    b->forward =list;
}
```

An important issue is where to allocate a new data item if a cache block is full. ccmalloc tries to put the new data item as close to the existing item as possible. Putting the items on the same virtual memory page is likely to reduce the program's working set, and improve translation look aside buffer performance, by exploiting the strong hint from the programmer that the two items are likely to be accessed together. Moreover, putting them on the same page ensures that they will not conflict in the cache. There are several possible strategies to select a block on the page. A closest strategy tries to allocate the new element in a cache block as close to the existing block as possible. A new-block strategy allocates the new data item in an unused cache block, optimistically reserving the remainder of the block for future calls on ccmalloc. A first-fit strategy uses a first-fit policy to find a cache block that has sufficient empty space. Other strategies and methods of allocating data items may also be used.

Garbage Collection

In a further embodiment, a garbage collection routine is used to remove objects from cache lines that have not been accessed for some time and are no longer required by active threads of program execution. Garbage collection is the process of locating data in dynamically-allocated memory that is no longer being used and reclaiming the memory to satisfy future memory allocation requests. Garbage collection can occur in a number of situations. For example, when the amount of memory remaining in available memory falls below some pre-defined level, garbage collection is performed to regain whatever memory is recoverable. Also, a program or function can force garbage collection by calling the garbage collector. Still further, incremental garbage collection can be performed when a thread completes execution such that objects no longer needed by active thread are scavenged. Finally, the garbage collector may run as a background task that searches for objects to be reclaimed. The garbage collection routine ensures that small objects die at the rate that programs stop using them. In one form of garbage collection referred to as generational garbage collection, short lived objects are reclaimed quickly. This means that longer lived objects, which survive the garbage collection routine scavenges stay in the cache lines longer.

In a further embodiment, generational garbage collection is utilized. First, a program is instrumented to profile its data access patterns. The profiling data gathered during an execution is quickly used to optimize that execution, rather than a subsequent one. This technique relies on a property of object oriented programs—most objects are small (<32 bytes) as previously described—to perform low overhead (<6%) real-time data profiling. The garbage collector uses the profile to construct an object affinity graph, in which weighted edges encode the temporal affinity between objects (nodes). The object affinity graph is similar to the field affinity graph previously described. A copying algorithm uses the affinity graph to produce cache-conscious data layouts while copying objects during garbage collection. Experimental results for five Cecil programs show that this cache-conscious data placement technique reduces cache miss rates by approximately 21–42% and improves program performance by approximately 14–37%. It should be noted that such improvements will vary depending on the types of programs, programming language and object sizes.

Figure 11:
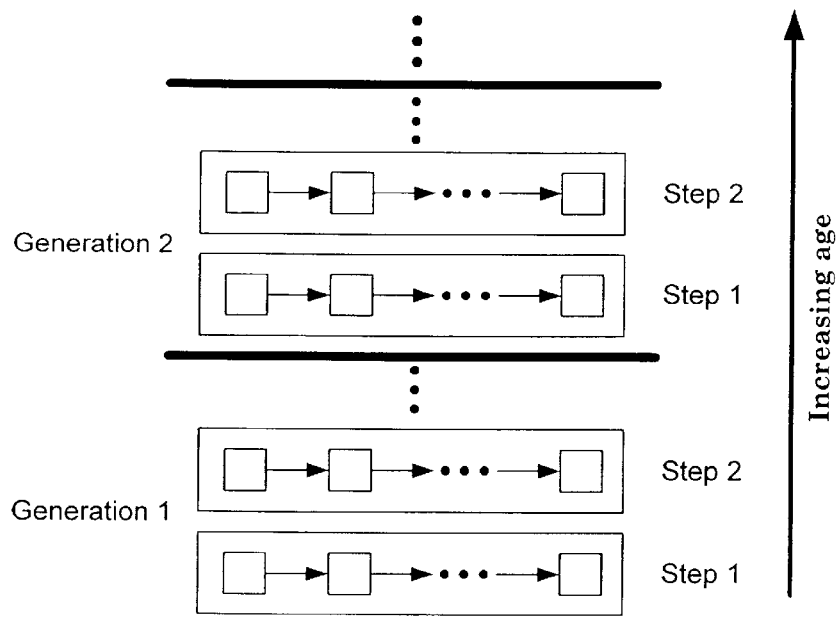
FIG. 11 is a block diagram of a heap organization from a garbage collector viewpoint.

The present embodiment of the invention uses a language-independent garbage collector toolkit. The toolkit implements a flexible generation scavenger with support for a time-varying number of generations of time-varying size. FIG. 11 illustrates the heap organization from the garbage collector's viewpoint. The garbage collected heap is divided into a number of generations. The youngest (first) generation holds the most recently allocated objects. Objects that survive repeated scavenges are promoted to older (higher) generations. Garbage collection activity focuses on young objects, which typically die faster than old objects. Each generation is divided into one or more steps, which encode objects' age. The first step of a generation is the youngest. Objects that survive scavenges are moved to the next step. Objects in the oldest step of a generation are promoted to the youngest step of the next generation. Each step consists of a collection of fixed size blocks, which are not necessarily contiguous in memory. To simplify the implementation, generation contained a single step, but may be modified as desired.

The garbage collector toolkit also provides a separate large object space (LOS) as part of the collected area. Each step has an associated set of large objects (>256 bytes) that are of the same age as the small objects in the step. A step's large objects, though logically members of the step, are never physically moved. Instead, they are threaded onto a doubly linked list and moved from one list to another. When a large object survives a collection, it is unlinked from its current step's list and added to the TO space list of the step to which it is promoted. The toolkit does not compact large object space.

A scavenger always collects a generation g and all generations younger than g. Collecting a generation involves copying all objects in the generation that are reachable from the roots (objects in the generation pointed to by objects in older generations) into free blocks. The blocks that previously held the generation can be reused. The new space to which generation objects are copied is called TO space and the old space is called FROM space.

A common traversal algorithm for copying objects into TO space is shown in pseudo code in FIGS. 12A and 12B which may be viewed with the code from 12A continuing at the top of FIG. 12B. Starting with the root set, objects are traversed in breadth-first order and copied to TO space as they are visited. Breadth-first traversal requires a queue. Objects to be processed are extracted from the head of the queue, while their children (if any) are added to the tail of the queue. The algorithm terminates when the queue is empty.

Figure 13:
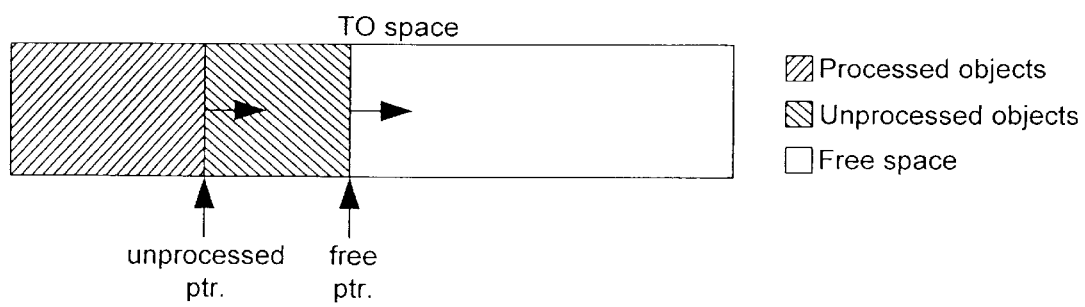
FIG. 13 is a block representation of space as used by the traversal algorithm.

The traversal algorithm does not use extra space to maintain the queue. Rather, it uses an elegant technique illustrated in FIG. 13 which utilizes two pointers (unprocessed and free). Since the algorithm copies objects as they are visited, it uses these TO space copies as queue elements for breadth-first traversal. The head and tail of the queue are marked by the unprocessed and free pointer, respectively. Once an object is processed, it is removed from the head of the queue by incrementing the unprocessed pointer, and any children it may have are added to the tail of the queue by copying them to TO space and incrementing the free pointer.

In the absence of programmer annotations or compiler analysis, cache-conscious data placement requires measurements of data access patterns to be effective. A profile of an earlier training run is commonly used to guide program optimizations. However, data access patterns require real-time profiling because of the difficulty of providing names for objects that are consistent and usable between runs of a program. Real-time profiling also spares a programmer an extra profile-execute cycle, as well as the difficulty of finding representative training inputs. However, the overhead of real-time profiling must be low, so the performance improvements are not outweighed by profiling costs.

The design and implementation of a low-overhead, real-time data access profiler is now described. In the most general case, profile-guided data placement requires tracing every load and store to heap data. The overhead of such tracing (factor of 10 or more) precludes its use in real-time profiling. However, two properties of object-oriented programs permit low overhead data profiling:

most objects are small, often less than 32 bytes, and
 most object accesses are not lightweight.

If most objects are small (<32 bytes), then it is not necessary for data profiling to distinguish different fields within the same object, since cache blocks are currently larger (e.g., 64 bytes in the UltraSparc) and growing. Profiling can be implemented at object, not field, granularity. Moreover, if most object accesses are not lightweight (i.e., multiple fields are accessed together or an access involves a method invocation), then profiling instrumentation (several instructions per object access) will not incur a large overhead.

Figure 14:
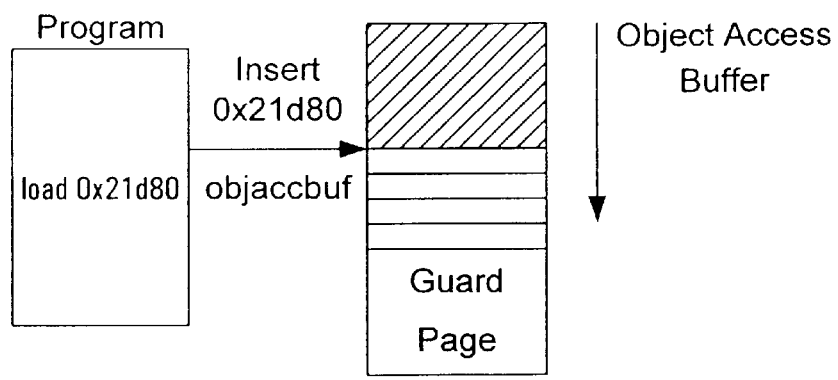
FIG. 14 is a block representation of a sequential store buffer to access records of temporal ordering of object accesses.

The real-time data profiling system instruments loads of base object addresses, using information provided by a slightly modified compiler, which retains object type information until code generation to permit selective load instrumentation. The instrumentation enters the base object address in an object access buffer, which is a sequential structure, similar to the sequential store buffer used in the garbage collection toolkit as shown in FIG. 14. This object access buffer records the temporal ordering of a program's object accesses. FIG. 15 shows the instrumentation emitted for a base object address load (assuming the object access buffer pointer is stored in a dedicated register).

The object access buffer is normally processed just before a scavenge to construct object affinity graphs. However, it may overflow between scavenges. Rather than include an explicit overflow check in the instrumentation, the virtual memory system causes a page trap on buffer overflow. The trap handler processes the buffer to construct object affinity graphs and restarts the application. Our experience indicates that setting the buffer size to 15,000 entries (60 KB) prevents overflow.

Generational garbage collection copies live objects to TO space. The goal is to use data profiling information to produce a cache-conscious layout of objects in TO space that places objects with high temporal affinity next to each other, so that they are likely to be in the same cache block. The data profiling information captures the temporal ordering of base object addresses, which the system uses to construct object affinity graphs. An object affinity graph is a weighted undirected graph in which nodes represent objects and edges encode temporal affinity between objects.

Since generational garbage collection processes objects in the same generation together, a separate affinity graph is constructed for each generation except the first. This is possible because an object's generation is encoded in its address. Although this scheme precludes placing objects in two different generations in the same cache block, this approach was selected for two reasons. First, the importance of inter-generation object co-location is unclear. Second, the only way to achieve inter-generation co-location is to demote the older object or promote the younger object. Both alternatives have disadvantages. Since generational garbage collection copies all objects of a generation together, intra-generation pointers are not explicitly tracked. The only safe way to demote an object is to subsequently collect the generation it originally belonged to, in order to update any pointers to the demoted object, which can produce unacceptably long garbage collection times. The other option is to promote the younger object. Such promotion is safe since the younger object's generation is being collected (this will update any intra- generation pointers to the object). Moreover, generational collectors track pointers from older objects to younger objects, so they could be updated (at a possibly high processing cost). However the locality benefit of this promotion will not start until the older generation is collected (since it cannot be co-located with the older object until that time), which may be much later. In addition, there is the danger of premature promotion if the younger object does not survive long enough to merit promotion.

FIG. 16, FIG. 17, and FIG. 18 contain the algorithm used to construct object affinity graphs (one per generation) from profile information. The queue size used in the algorithm is an important parameter. Too small of a queue runs the risk of missing important temporal relationships, but a large queue can result in huge object affinity graphs and long processing times. A queue size of 3 was selected, since informal experiments indicated that it gave the best results. Other queue sizes may also be used depending on the processing resources available. Prior to each scavenge, the object affinity graphs can either be re-created anew from the contents of the object access buffer, or the profiling information can be used to update existing graphs. The suitability of these approaches depends on application characteristics. Applications with phases that access objects in distinct manners could benefit more from re-creation (provided phase durations are longer than the interval between scavenges), whereas applications with uniform behavior might be better suited to the incremental approach. In one embodiment, the object affinity graph is re-created prior to initiating a scavenge. This permits demand- driven graph construction that builds graphs only for the generations that are going to be collected during the subsequent scavenge.

Figure 19:
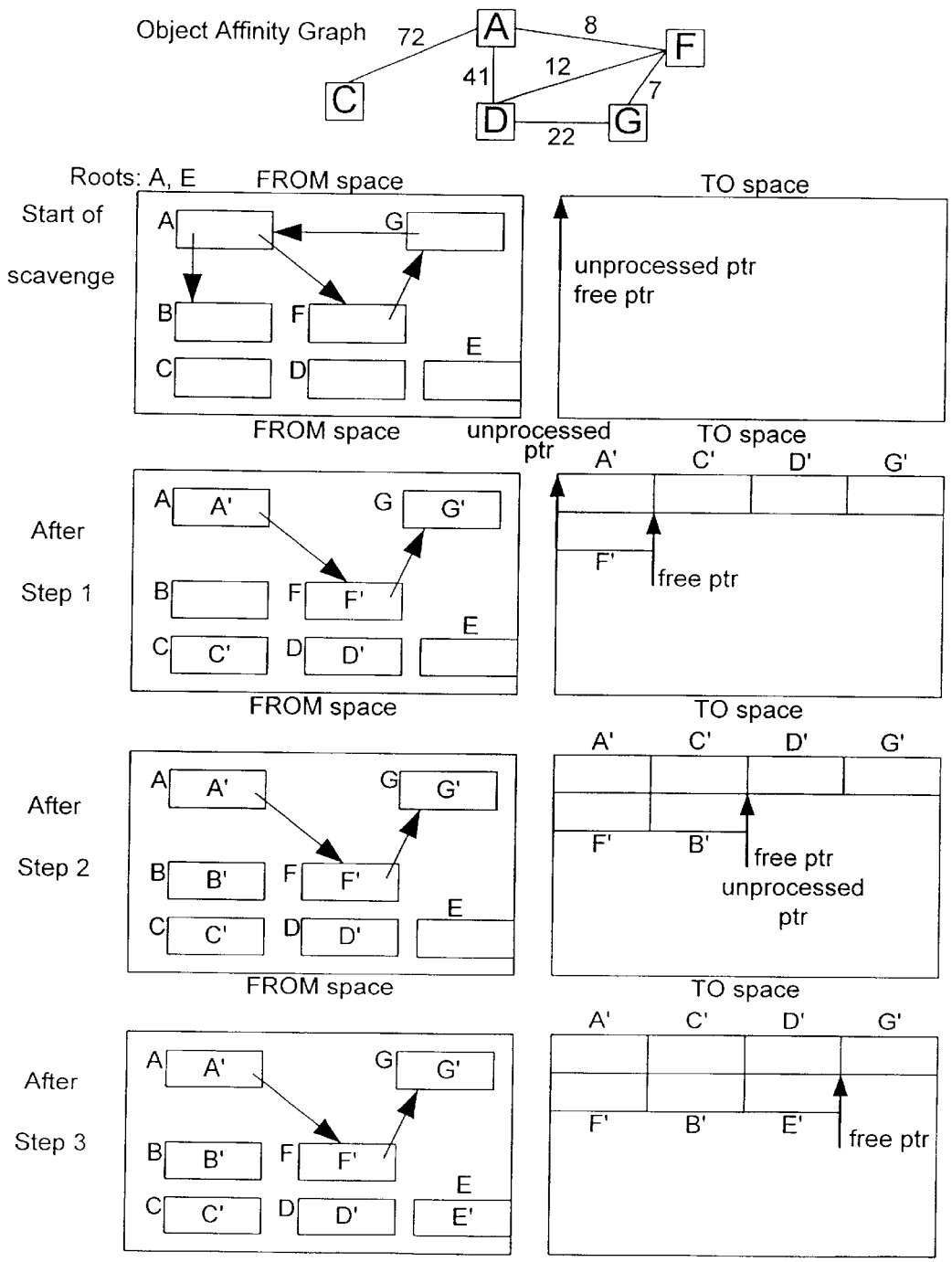
FIG. 19 is a pseudo code representation of a copying algorithm used to produce a cache-conscious layout of objects.

The traversal algorithm copies objects to TO space in breadth- first order. A modification to this algorithm can provide approximate depth-first copying. One can further refine the traversal to obtain hierarchical grouping of objects in TO space. The copying algorithm represented by pseudo code in FIG. 19 uses the object affinity graph to produce a cache-conscious layout of objects in TO space.

The cache-conscious copying algorithm of the current embodiment can be divided into three steps:

STEP 1: Flip the roles of FROM space and TO space. Initialize the unprocessed and free pointers to the beginning of TO space. From the set of roots present in the affinity graph, pick the one with the highest affinity edge weight. Perform a greedy depth-first traversal of the entire object affinity graph starting from this node (i.e., visit the next unvisited node connected by the edge with greatest affinity weight). The stack depth for the depth-first traversal is limited to the number of nodes in the object affinity graph, and hence the object access buffer can be used as a scratch area for this purpose. In parallel with this greedy depth-first traversal, copy each object visited to TO space (increment the free pointer). Store this new object address as a forwarding address in the FROM space copy of the object. After this step all affinity graph nodes will be laid out in TO space in a manner reflecting object affinities FIG. G9, but will still contain pointers to objects in FROM space.

STEP 2: All objects between the unprocessed and free pointers are processed using the traversal algorithm (except the copy roots portion).

STEP 3: This is a cleanup step where the root set is examined to ensure that all roots are in TO space (this is required as all roots may not be present in the object affinity graph or reachable from these objects). Any roots not present are copied to TO space and processed using the traversal algorithm (FIG. 18).

The first step of the algorithm copies objects by traversing the object affinity graph, which may retain objects not reachable from the roots of the generation (i.e., garbage). However since the system recreates the object affinity graph from new profile information prior to each scavenge, such garbage will be incorrectly promoted at most once. In addition, cache-conscious data placement efforts are focussed on longer-lived objects and do not use the copying algorithm in the youngest generation (where new objects are allocated and most of the garbage is generated).

Conclusion

Data structures are partitioned into heavily referenced and less heavily referenced portions. The partitioning is based on profile information about field access counts. In one embodiment, the most heavily referenced portions or hot portions of an object are kept in a hot object, while the remaining portions of the object are placed in a subordinate or cold object which is referenced by the original hot object as needed.

In a further aspect of the invention, the heavily referenced portions of a hot object are then placed next to each other in memory so that theare likely combined into common cache lines. The "cold" portions which were extracted from the class are placed in a new class that can be referenced from the original class. Accesses to hot portions remain unchanged. One aspect of the invention involves the selection of classes that show the greatest potential and least compatibility problems. A firther aspect of the invention involves the use of a cache-conscious object co-location scheme designed to minimize cache misses. Yet a further aspect of the invention involves the application of the partitioning to Java programs.

While the invention has been described as of benefit to object oriented languages supporting levels of indirection such as Java based applications, it will be recognized that other languages which provide the ability to separate out classes and provide for indirection will also benefit from the present invention. The size of the cache line compared to the size of the objects will also affect the operation of the invention. If the cache line size is large compared to the hot object or class size, many objects may be combined such that they are likely to reside on the same cache line, resulting in the potential for great performance improvements, beyond those provided just by having a larger cache line. Cache lines typically run about 64 bytes in current computer systems. Other sizes, such as 16, 32, 128, 256 and larger are also contemplated. The lines need not be a power of two in further embodiments.

Further improvements include the use of garbage collection on the objects to scavenge less utilized objects and ensure that the objects having the most heavily referenced data members—the hot objects—are most likely co-located on the same cache lines. Many different types of garbage collection, from standard to incremental may be used.

Extensive and expensive memory hierarchies require programmers to be concerned about the cache locality of their data structures. In general, properly laying out structures requires a deep understanding of a program's structures and operation. This paper describes an extremely attractive alternative for languages that support garbage collection. A generational garbage collector can easily be modified to produce cache-conscious data layouts of small objects. The paper demonstrates the feasibility of low- overhead, real-time profiling of data access patterns for object-oriented languages and describes a new copying algorithm that uses this information to produce cache- conscious object layouts. Measurements show that this technique reduces cache miss rates by 21–42% and improves program performance by 14–37%, as compared to the commonly used alternative. Techniques such as these may help narrow, or even reverse, the performance gap between high-level programming languages, such as Lisp, ML, or Java, and low-level languages such as C or C++.

This application is intended to cover any adaptations or variations of the present invention. It is manifestly intended that this invention be limited only by the claims and equivalents thereof.

We claim:

1. A method of segregating field members in classes of a program comprising:

obtaining field member access information for each field member from running an application;

determining the number of accesses for each class;

determining the number of accesses for each field member of each class; and identifying field members as hot which have been accessed a predetermined number of times.

2. The method of claim 1 wherein the predetermined number of times is determined from a percentage of accesses for the respective class.

3. The method of claim 2 wherein the percentage is approximately five percent or more.

4. The method of claim 1 wherein the predetermined number of times is selected to comprise a set of top fields that occupy a predetermined number of bytes.

5. A method of improving cache hit ratios comprising:

identifying field members which are least often accessed in a class during the running of an application as cold members and those which are most often accessed as hot members;

segregating the cold members of each class into separate classes; and providing a level of indirection to obtain access to such cold members in the separate classes.

6. The method of claim 5 wherein the level of indirection comprises using a reference field in the class containing the hot members.

7. The method of claim 5 wherein the class containing cold members comprises a constructor method.

8. A method of segregating field members in original classes of a program comprising:

obtaining field member access information for each field member from running an application;

determining the number of accesses for each class;

determining the number of accesses for each field member of each class;

identifying field members as hot which have been accessed a predetermined number of times;

identifying the remaining field members as cold;

segregating the cold members of each class into separate classes; and providing a level of indirection to obtain access to such cold members through the original classes.

9. A method of segregating field members in classes of a program comprising:

obtaining field member access information for each field member from running an application;

determining the number of accesses for each class;

determining the number of accesses for each field member of each class;

identifying field members as hot which have been accessed a predetermined percentage of the number of accesses for its respective class;

identifying the remaining field members as cold; and segregating the cold members of each class into separate classes.

10. The method of claim 9 and further comprising independently loading the classes and separate classes into cache lines.

11. The computer readable medium of claim 9 and further comprising:

independently loading the classes and separate classes into cache lines.

12. A method of improving cache hit ratios comprising:

identifying field members which are least often accessed in a class during the running of an application as cold members and those which are most often accessed as hot members;

segregating the cold members of each class into separate classes;

providing a level of indirection to obtain access to such cold members in the separate classes; and applying a cache conscious reordering of the hot classes to improve cache hit ratios.

13. The method of claim 12 wherein the cache conscious reordering comprises a cache-conscious object co-location scheme.

14. A computer readable medium having computer executable instructions stored thereon for causing a computer to implement a method of segregating field members in classes of a program comprising:

obtaining field member access information for each field member from running an application;

determining the number of accesses for each class;

determining the number of accesses for each field member of each class; and identifying field members as hot which have been accessed a predetermined number of times.

15. The computer readable medium of claim 14 wherein the predetermined number of times is determined from a percentage of accesses for the respective class.

16. The computer readable medium of claim 15 wherein the percentage is approximately five percent or more.

17. The computer readable medium of claim 14 wherein the predetermined number of times is selected to identify the top five data members having the highest number of accesses as hot.

18. A computer readable medium having computer executable instructions stored thereon for causing a computer to implement a method of improving cache hit ratios comprising:

identifying field members which are least often accessed in a class during the running of an application as cold members and those which are most often accessed as hot members;

segregating the cold members of each class into separate classes; and providing a level of indirection to obtain access to such cold members in the separate classes.

19. The computer readable medium of claim 18 wherein references to cold members are changed to identify corresponding separate classes.

20. The computer readable medium of claim 18 wherein references to cold members are first directed to their original class and then redirected to corresponding separate classes.

21. A computer readable medium having computer executable instructions stored thereon for causing a computer to implement a method of segregating field members in classes of a program comprising:

obtaining field member access information for each field member from running an application;

determining the number of accesses for each class;

determining the number of accesses for each field member of each class;

identifying field members as hot which have been accessed a predetermined number of times;

identifying the remaining field members as cold;

segregating the cold members of each class into separeat classes; and providing a level of indirection to obtain access to such cold members in the separate classes.

22. A computer readable medium having computer executable instructions stored thereon for causing a computer to implement a method of segregating field members in classes of a program comprising:

obtaining field member access information for each field member from running an application;

determining the number of accesses for each class;

determining the number of accesses for each field member of each class;

identifying field members as hot which have been accessed a predetermined percentage of the number of accesses for its respective class;

identifying the remaining field members as cold; and segregating the cold members of each class into separate classes.

23. A computer readable medium having computer executable instructions stored thereon for causing a computer to implement a method of improving cache hit ratios comprising:

identifying field members which are least often accessed in a class during the running of an application as cold members and those which are most often accessed as hot members;

segregating the cold members of each class into separate classes;

providing a level of indirection to obtain access to such cold members in the separate classes; and applying a cache conscious reordering of the hot classes to improve cache hit ratios.

24. The computer readable medium of claim 23 wherein the cache conscious reordering comprises a Chilimbi and Larus cache-conscious object co-location scheme.

25. A computer system that segregates field members in classes of a program comprising:

means for obtaining field member access information for each field member from running an application;

means for determining the number of accesses for each class;

means for determining the number of accesses for each field member of each class; and means for identifying field members as hot which have been accessed a predetermined number of times.

26. A computer system for improving cache hit ratios comprising:

means for identifying field members which are least often accessed in a class during the running of an application as cold members and those which are most often accessed as hot members;

means for segregating the cold members of each class into separate classes; and means for providing a level of indirection to obtain access to such cold members in the separate classes.

27. A computer program stored on a computer readable medium for improving cache hit ratios comprising:

a module that identifies field members which are least often accessed in a class during the running of an application as cold members and those which are most often accessed as hot members;

a module that segregates the cold members of each class into separate classes; and a module that provides a level of indirection to obtain access to such cold members in the separate classes.

* * * * *